US011719786B2

(12) United States Patent
Ranney et al.

(10) Patent No.: US 11,719,786 B2
(45) Date of Patent: Aug. 8, 2023

(54) ASYNCHRONOUS, COHERENT, RADAR TRANSMITTER-RECEIVER SYSTEM

(71) Applicant: U.S. Army Combat Capabilities Development Command, Army Research Laboratory, Adelphi, MD (US)

(72) Inventors: Kenneth I. Ranney, Monrovia, MD (US); Kyle A. Gallagher, Silver Spring, MD (US); Daniel T. Galanos, Silver Spring, MD (US); Abigail S. Hedden, Vienna, VA (US); Roger P. Cutitta, Westminster, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 144 days.

(21) Appl. No.: 17/173,680

(22) Filed: Feb. 11, 2021

(65) Prior Publication Data

US 2021/0263132 A1 Aug. 26, 2021

Related U.S. Application Data

(60) Provisional application No. 62/981,102, filed on Feb. 25, 2020.

(51) Int. Cl.
| G01S 7/288 | (2006.01) |
| G01S 13/00 | (2006.01) |
| G01S 7/292 | (2006.01) |

(52) U.S. Cl.
CPC ............. *G01S 7/288* (2013.01); *G01S 7/292* (2013.01); *G01S 13/003* (2013.01); *G01S 7/2883* (2021.05)

(58) Field of Classification Search
CPC ........ G01S 7/288; G01S 7/292; G01S 13/003; G01S 7/2883; G01S 7/28; G01S 13/0209
See application file for complete search history.

(56) References Cited

U.S. PATENT DOCUMENTS 6,834,073 B1* 12/2004 Miller .................... G01S 7/023
375/E1.001
10,310,066 B1* 6/2019 Zatman .................. G01S 13/46
(Continued)

FOREIGN PATENT DOCUMENTS

WO WO-2019073230 A1 * 4/2019

OTHER PUBLICATIONS

Ettus Research's USRP X310 platform webpage available at: https://www.ettus.com/all-products/x310-kit/ (accessed Feb. 24, 2020).
(Continued)

*Primary Examiner* — Erin F Heard
*Assistant Examiner* — Kenneth W Good
(74) *Attorney, Agent, or Firm* — Eric B. Compton

(57) ABSTRACT

According to embodiments, a radar system includes: at least one radio receiver which is comprised of: an antenna configured to receive RF data including both the direct-path RF signal transmitted from a radio transmitter and a reflected RF signal when the transmitted RF signal is reflected from the target; a memory configured to store the same predetermined RF waveform profile data used by the transmitter to generate and transmit the RF signal; a timing unit to provide timing; a matched filter application configured to generate and apply a matched filter for identifying RF signal signatures in RF data; and one or more processors configured to: (i) analyze the received RF data to identify multiple, repeated, individual RF signals corresponding to the direct-path transmitted RF signal; (ii) split the identified RF signals corresponding to the direct-path transmitted RF signal into
(Continued)

a plurality of repeating units each having an interval time; (iii) create a matched filter using the predetermined transmit waveform (stored in memory) and apply the matched filter to each of repeating units to provide (a) a plurality of direct-path transmitted RF signal arrival times; and (b) a plurality of reflected RF signal arrival times; (iv) adjust relative arrival times and phases of the repeating units of the direct-path transmitted RF signal; and (v) generate radar data from the reflected RF signal further using the adjusted times and phases for arrival times of the repeating units of the direct-path transmitted RF signal.

19 Claims, 14 Drawing Sheets

(56) References Cited

U.S. PATENT DOCUMENTS

| | | | | |
|---|---|---|---|---|
| 10,321,275 | B1* | 6/2019 | Orlov | H04W 4/025 |
| 10,924,130 | B1* | 2/2021 | Serebryanskiy | H03H 17/0657 |
| 11,204,410 | B2* | 12/2021 | Jansen | G01S 13/34 |
| 2006/0227042 | A1* | 10/2006 | Budic | G01S 13/003 |
| | | | | 342/195 |
| 2008/0088508 | A1* | 4/2008 | Smith | G01S 13/878 |
| | | | | 342/453 |
| 2008/0204322 | A1* | 8/2008 | Oswald | G01S 5/04 |
| | | | | 342/465 |
| 2009/0167607 | A1* | 7/2009 | Holder | G01S 13/003 |
| | | | | 342/453 |
| 2012/0200453 | A1* | 8/2012 | Brosche | H03M 3/47 |
| | | | | 342/175 |
| 2016/0209494 | A1* | 7/2016 | Mazzaro | G01S 7/35 |
| 2016/0341821 | A1* | 11/2016 | Wang | B60L 53/126 |
| 2017/0146645 | A1* | 5/2017 | Kim | G01S 13/347 |
| 2017/0370678 | A1* | 12/2017 | Holder | G05D 1/0088 |
| 2019/0049575 | A1* | 2/2019 | Ranney | G01S 13/9017 |
| 2020/0142047 | A1* | 5/2020 | Zwirn | G01S 13/003 |
| 2021/0405183 | A1* | 12/2021 | Vossiek | G01S 13/003 |

OTHER PUBLICATIONS

Mathwork's Two-dimensional Constant-False-Alarm-Rate (CFAR) Detector webpage available at: https://www.mathworks.com/help/phased/ref/2dcfardetector.html (accessed Feb. 24, 2020).

Declaration of Kenneth Ranney regarding the paper and/or presentation presented at the 2019 Military Sensing Symposium (MSS) for Battlefield Survivability and Discrimination (BCD) Working group, held Feb. 25-28, 2019 in Orlando, Florida.

* cited by examiner

Notice how the peak offset relative to the initial pulse (Pulse 1) increases as the pulse index increases.

ASYNCHRONOUS, COHERENT, RADAR TRANSMITTER-RECEIVER SYSTEM

RELATED APPLICATION DATA

This application claims the benefit of U.S. Provisional Patent Application No. 62/981,102 filed Feb. 25, 2020, the disclosure of which is herein incorporated by reference in its entirety for all purposes.

STATEMENT OF GOVERNMENT INTEREST

The invention described herein may be manufactured, used, and licensed by or for the United States Government without the payment of royalties.

BACKGROUND OF THE INVENTION

Field

This application generally relates to radar systems, and in particular to, asynchronous, coherent radar transmitter-receiver systems.

Background

Passive radar systems often utilize two receive channels to effectively process target returns. When this is the case, one channel provides a direct-path measurement of the transmitted waveform, while the other channel provides a measurement of an area under surveillance. The direct-path, or reference, measurement serves as a matched filter for the surveillance, or target, measurement. To obtain a "pristine" matched filter response, the reference-channel antenna is typically pointed toward the transmitter, which is (ideally) located in a null of the target-channel antenna pattern.

Bistatic and multi-static systems face similar synchronization problems, especially when the transmitter and receivers are widely separated. In such cases, the separated receivers may also measure "direct path" references and process the data in a manner similar to the passive system. Here, the only real difference is that the bistatic (or multi-static) radar operator has control over the transmit waveform parameters. If a direct-path measurement is not available, the synchronization between transmitter and receiver—necessary for coherent processing—must be obtained in some other way. If the separation is not too great, this may be possible via a direct, physical connection enabling both transmitter and receiver to share a common clock.

Improvements thus are desirable.

BRIEF SUMMARY OF THE INVENTION

Embodiments of the present invention provide asynchronous, coherent radar systems and processing.

According to embodiments, a radar system includes: at least one radio receiver which is comprised of: an antenna configured to receive RF data including both the direct-path RF signal transmitted from a radio transmitter and a reflected RF signal when the transmitted RF signal is reflected from the target; a memory configured to store the same predetermined RF waveform profile data used by the transmitter to generate and transmit the RF signal; a timing unit to provide timing; a matched filter application configured to generate and apply a matched filter for identifying RF signal signatures in RF data; and one or more processors configured to: (i) analyze the received RF data to identify multiple, repeated, individual RF signals corresponding to the direct-path transmitted RF signal; (ii) split the identified RF signals corresponding to the direct-path transmitted RF signal into a plurality of repeating units each having an interval time; (iii) create a matched filter using the predetermined transmit waveform (stored in memory) and apply the matched filter to each of repeating units to provide (a) a plurality of direct-path transmitted RF signal arrival times; and (b) a plurality of reflected RF signal arrival times; (iv) adjust relative arrival times and phases of the repeating units of the direct-path transmitted RF signal; and (v) generate radar data from the reflected RF signal further using the adjusted times and phases for arrival times of the repeating units of the direct-path transmitted RF signal.

In process (i), to analyze the received RF data to identify multiple, repeated, individual RF signals corresponding to the direct-path transmitted RF signal, the one or more processors may be configured to apply a power detecting matched filter. In process (ii), to split the direct-path transmitted RF signal, the one or more processors may be further configured to remove DC components within each of the repeating units. Additionally, in process (ii), to split the direct-path transmitted RF signal, the one or more processors may use (a) a power-detecting, template, or (b) standard matched filtering. In process (iii), to create and apply the matched filter, the one or more processors may be configured to use standard matched filtering. Furthermore, in process (iii), to create and apply the matched filter, the one or more processors may be further configured to: interpolate the matched filter output for the arrival times for each of the repeating units by a predetermined interpolation factor. The predetermined interpolation factor may be 10-20, for example. In process (iv), to adjust relative arrival times and phases of the repeating units of the identified reflected RF signal, the one or more processors may be configured to: determine the time and phase within the first repeating unit of the first arrival of the direct-path transmitted RF signal; set the time and phase for the determined first arrival time as a reference time and phase, respectively; and adjust the times and phases of the first arrivals of the identified direct-path transmitted RF signal and reflected RF signal within each of the remaining repeating units so that the direct-path transmitted signal matches the direct-path reference time and phase. In process (v) to generate radar data, the one or more processors are configured to apply a moving target indication (MTI) detection algorithm or a synthetic aperture radar (SAR) detection algorithm.

The at least one radio receiver may comprise two or more radio receivers. In such embodiments, the timing units of the two or more radio receivers have same clock rate. The at least one radio receiver may store a copy of the same transmitted RF signal waveform used by the radio transmitter in some cases.

The timing unit of the at least one radio receiver may operate at frequencies from 250 MHz to 1.2 GHz, for instance. The timing unit of the receiver is preferably independent of the timing of the radio transmitter. More, the at least one radio receiver does not need to use a synchronization signal provided by the radio transmitter. Nor does the at least one radio receiver need to use GPS.

According to embodiments, the radar system may be comprised of the radio transmitter configured to transmit the RF signal to the target generated according to the predetermined RF waveform profile data. Here, the transmitter and at least one radio receiver can be software defined radios (SDRs).

These and other embodiments of the invention are described in more detail, below.

BRIEF DESCRIPTION OF THE DRAWINGS

The foregoing and other objects, features, and advantages of the invention will be apparent from the following more detailed description of non-limiting embodiments of the invention, as illustrated in the accompanying drawings, where:

FIG. 6(A) shows transforming the pulse which is in the time domain into the frequency domain, FIG. 6(B) shows zero-padding to a desired interpolation factor, and FIG. 6(C) shows transforming the pulse back to the time domain.

FIG. 7(A) shows no interpolation, and FIG. 7(B) shows after interpolation.

FIG. 8(A) shows coarse time alignment/adjustment, FIG. 8(C) shows phase alignment/adjustment, and FIG. 8(C) details the result after time- and phase-alignment showing "perfect" overlay of second pulse onto first pulse.

Figure 1:
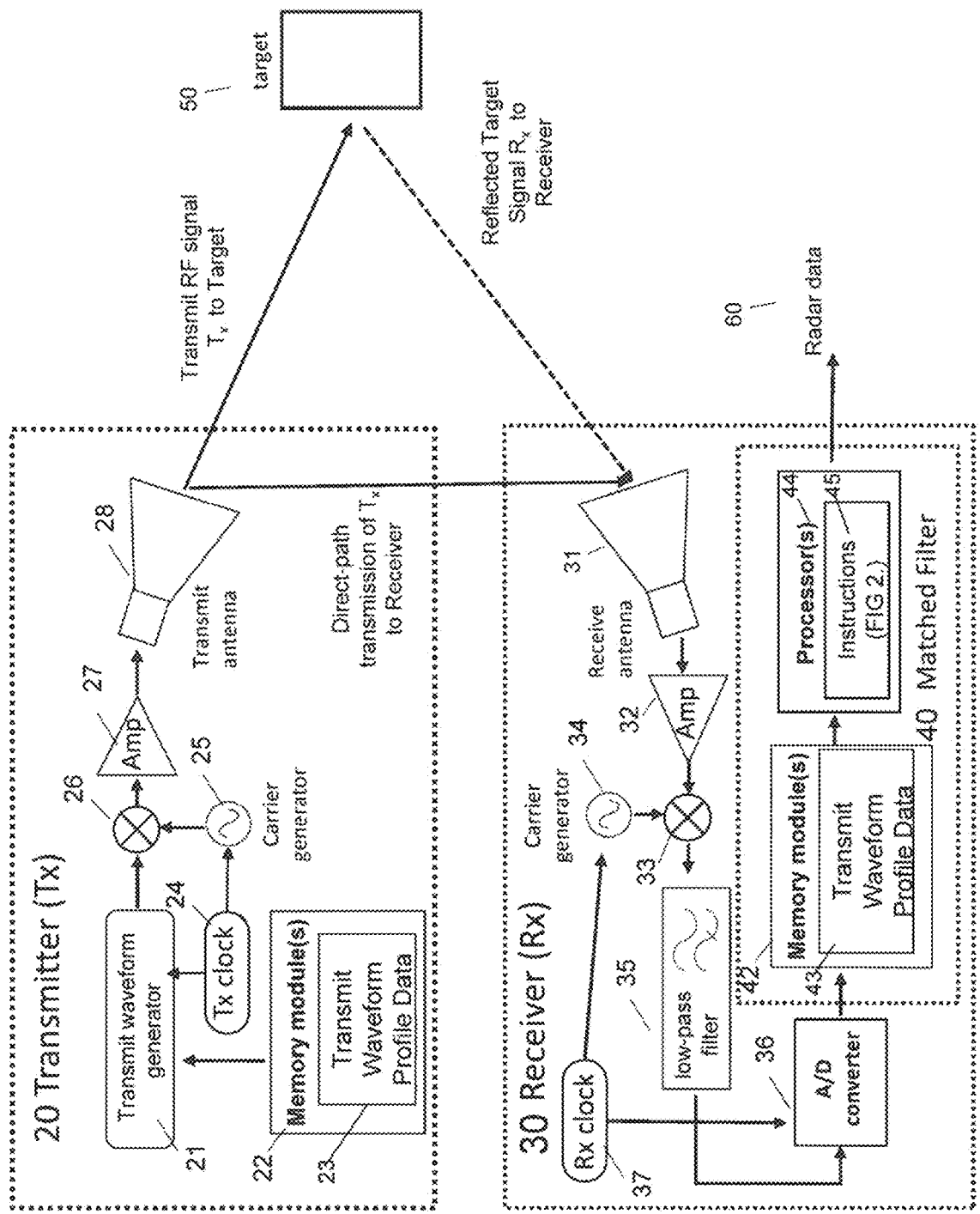
FIG. 1 is a diagram of one exemplary radar system according to embodiments.

A more complete appreciation of the invention will be readily obtained by reference to the following Detailed Description and the accompanying drawings in which like numerals in different figures represent the same structures or elements. The representations in each of the figures are diagrammatic and no attempt is made to indicate actual scales and/or precise ratios.

DETAILED DESCRIPTION

A novel radar system comprises at least one radio receiver configured to perform coherent (radar) processing. It may include a radio transmitter and the at least one radio receiver to provide with a multi-node radar system. The radar system performs coherent processing without the use of a distributed clock signal among the constituent radio units. Instead, coherent processing is realized with each of the radio units (for the transmitter and the receiver(s)), containing its own clock that is reasonably stable throughout a pre-defined interval of operation. Each receiver also maintains transmitted waveform profile data/information that it uses to perform matched filtering (e.g., pulse compression). In some implementations/embodiments, this may be a digitally-stored copy of the transmitted waveform used by the transmitter. By adjusting the location and phase of the resulting peaks across multiple pulses, each receiver produces data suitable for coherent processing (e.g., Doppler processing to detect moving targets).

The radar system leverages the assumed stability of each of the receiver radio unit(s)' clocks with precise knowledge of the transmitted waveform to extract timing information between their disconnected radio units. For each of these processes, the radio units may be assumed to be: 1) roughly synchronized ahead of time (such as at the beginning of a mission). Additional assumptions may be made based on the specific type of coherent radar processing applied. For instance, for moving target indication (MTI) applications, the radio units may further be assumed to be 2a) immobile during a coherent processing interval (CPI). And, for synthetic aperture radar (SAR) applications, it may be further assumed that 2b) the transmitter and target remain immobile while the receiver may move; for SAR, the receiver is only assumed to be stationary during at least one pulse repetition interval (PRI).

In addition, the direct path (from transmitter to receiver) signal may be assumed to be measureable and identifiable. Clock differences (between radios units) manifest themselves as a relative drift from one pulse to the next. Waveform samples (within a single pulse) are assumed to be accurate enough to produce the expected matched-filter outputs. Thus, the relative timing differences between pulses can be corrected by adjusting the matched filter output's peak location as well as its phase relative to an initial (reference) pulse within a CPI. After these corrections are made, coherent processing (e.g., generate range/Doppler plots) can then be performed. Range estimates can be obtained through estimates of the receiver location relative to the transmitter. The precision of this estimate generally depends on the precision of the transmitter and receiver location estimates. Even with no position knowledge, however, detection of targets will still be possible.

Unlike many conventional ground-based, passive and active bistatic radars, the novel radar system embodiments do not require or use a separate receive channel to measure a reference (or beacon) signal used for cross-correlation. That is, there is no cross-correlation between a measured "surveillance" signal and a measured target signal. Since all of the transmit- and receive-units are cooperative (albeit, asynchronous), they all have a copy of the transmitted waveform that has been sampled at (exactly) the same rate. Hence, the distributed receivers of the system perform matched filtering in the same way that active receive channels perform matched filtering. And since transmissions are under the users' control, several system parameters can be varied as necessary. These include the characteristics of the transmitted waveform (e.g., bandwidth), as well as the transmitter's location and the transmitted power. As such, a separate "beacon" signal—or other signal for synchronization purposes only—is also unnecessary. A targeted application for this invention (moving target indication) uses widely distributed low-size, weight and power (SWaP), ground-based receivers and a known transmitter.

FIG. 1 is a diagram of one exemplary radar system 10 according to embodiments of the present invention. The system 10 includes a radio transmitter 20 and at least one radio receiver 30 configured to perform coherent (radar) processing.

Figure 3:
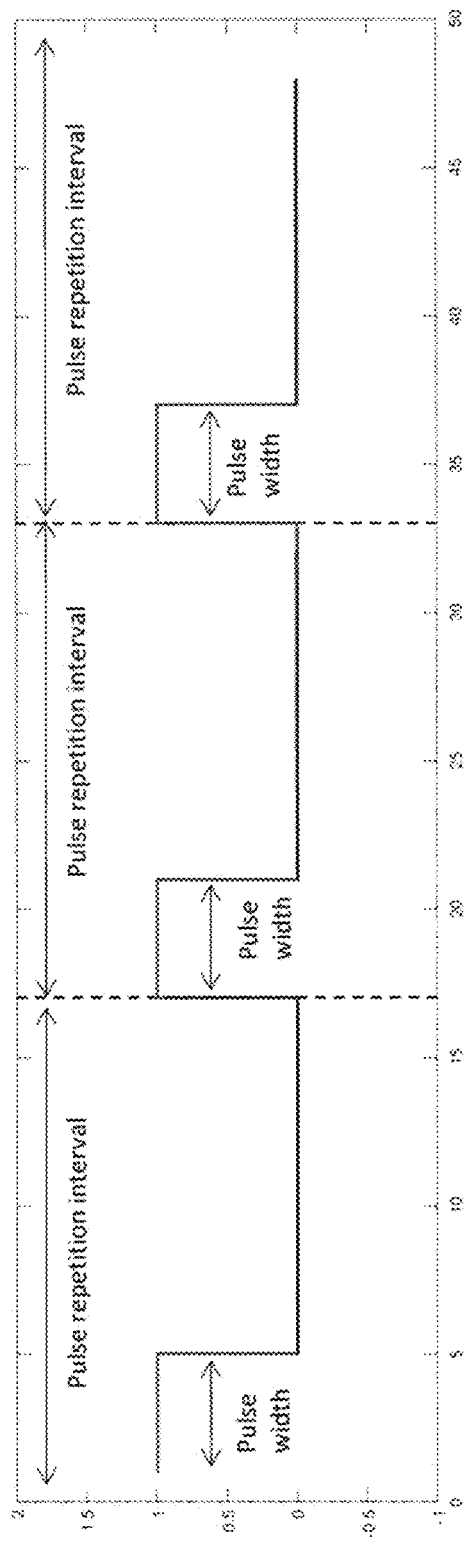
FIG. 3 is a simplified schematic of signal pulses.

The transmitter 20 transmits a transmit RF signal, Tx, to a target 50. RF stands for radio frequency. The transmit RF signal such be suitable for radar applications. For instance, the transmit RF signal may be any conventional "chirp" or "sweep" signal for radar applications; the frequency increase (up-chirp) or decreases (down-chirp) with time. In general, the transmit RF signal may be characterized as a series of individual repeating pulses. (A simplified schematic of the pulses is depicted in FIG. 3). The transmitter 20 generates and transmits a transmit RF signal to the target 50.

The target 50 may be an object, like a vehicle, such as a car, truck or airplane, for instance. The target 50 may be moving and/or stationary. Assuming the transmit RF signal makes it to the target and it is reflected, it becomes a reflected RF signal, Rx. The reflected RF signal has the same general waveform shape as the transmit RF signal, but is time and/or phase shifted. Moreover, the amplitude of the reflected RF signal is less than the transmit RF signal due to attenuation associated with the longer path to the target 50. And, if the target moves, then the reflected RF signal should appear in slightly different locations across several pulses. These extremely small location offsets manifest themselves as phase changes in the reflected RF signal, and can be detected using Doppler processing techniques commonly employed by practitioners of the art. (In the case of a moving target, the receiver 30 may be referred to as a "moving target detector").

More particularly, the transmitter 20 includes a transmit waveform generator 21. Within memory module(s) 22, transform waveform profile data 23 is stored. Memory module(s) 22 may be any digital memory means. The transform waveform data 23 sets forth the key parameters (e.g., amplitude, phase, duration, etc.) so that the transmit RF signal can be generated by transmit waveform generator 21 which could be any conventional signal generator suitable for radar. The transmitter 20 includes an internal timing unit or clock 24 for precise timing control of its own processing, including waveform generation and transmission. A base or carrier signal is generated using a carrier generator 25. The transmit waveform generated by the transmit waveform generator 21 is mixed with the base signal generated by the carrier generator 25 at multiplier 26. The mixed signal is then amplified at amplifier 27 and transmitted (or broadcast) via the transmitter antenna 28.

In embodiments, the transmitter antenna 28 is configured to radiate a high-power RF signal and is located at some distance (for example, 10 kilometers) from the receiver 30. Note that the accuracy of the target position estimate will be affected by the relative positions of the various transmit and receive units. Ideally, the transmitter 20 would be nearly in-line (e.g., along the direct-path to the target) with the receiver 30 and the target area, thereby simplifying the geometry. The only requirement, however, is that the receiver 30 be able to receive both the direct-path and reflected signals.

The receiver 30 receives RF data using a receive antenna 31. The RF data includes both the direct-path RF signal transmitted from the transmitter and a reflected RF signal when the transmitted RF signal is reflected from the target. The RF data may be generally assumed to be the sum of the direct-path transmitted RF signal from the transmitter and the reflected RF signal from target. The receiver 30 should be located in an area such that it can receive the direct-path RF signal transmitted from the transmitter and the reflected RF signal from the target. This may depend on a number of variables, such as the target shape/material/size, etc.

The RF data received by the receive antenna 31 is amplified at amplifier 32 to boost its gain. Next, the amplified RF data is converted to baseband at multiplier (mixer) 33 using a carrier signal generated with a carrier generator 34. The RF data may also include noise and/or other interference which is not of interest for processing. Unwanted signals and noise may be removed with a low-pass filter 35. The RF signal data is digitized with an Analog/Digital (A/D) converter 36. Those skilled in the art will appreciate that the RF data may be in the form of a complex data sequence, e.g., in-phase and quadrature samples ($I_n$, $Q_n$).

The receiver 30 includes an internal timing unit or clock 37 for precise timing control of its own processing, including waveform receiving and coherent radar processing. For instance, the clock 37 typically operates at frequencies from 250 MHz to 1.2 GHz, and it determines the bandwidth available for radar processing according to the Nyquist criterion—well-known to practitioners of the art. However, of key importance to the radar system 10, is that the receiver's clock 37 is independent (or asynchronous) of the transmitter's clock 24 and any other receiver(s)' clocks. In this case, there is also no need for a conventional "beacon" signal to maintain synchronization between the transmitter and receiver(s).

In its simplest form, the radar system 10 includes one transmitter 20 and one receiver 30 as is depicted in FIG. 1. This simplified system represents a more flexible realization, since it does not require coordination between multiple transmitters. Note that such coordination could be established before the multiple transmitters are dispersed, but then more precise synchronization must be maintained. If the receivers have the capability to receive multiple carrier frequencies, then simultaneous transmission could be achieved without the need for synchronization of the transmitters. Separate units cannot transmit simultaneously at the same carrier frequency.

Of course, additional receiver(s) 30 could be provided for in various embodiments and implementations. To best achieve coherence, it is preferable that all receivers 30 in the system have similar receiver hardware (for example the same model radio produced by the same manufacturer). This enables them to run at the same, reasonably stable clock rate. Clock differences (among and between receiver units) are assumed to manifest themselves as a slight relative drift from one pulse to the next, but the clock is stable enough to perform accurate matched filtering within one pulse repetition interval.

In some embodiments, the individual radio transmitter unit 20 and/or radio receiver unit 30 may comprise software defined radios (SDR) specifically configured for the novel operation and processing according to embodiments as disclosed here. One exemplary software defined radio is the USRP X310 platform from Ettus Research. For additional info, see https://www.ettus.com/all-products/x310-kit/, the webpage herein incorporated by reference. In some further SDR embodiments, one serves as the transmitter and another (or additional ones) serves as receiver(s).

A matched filter 40 is included in the receiver 30 for RF signal detection, location and identification. In general, the matched filter 40 correlates a known signal (also known as a template), with a given signal to detect the presence of the template in the given signal. For instance, the matched filter 40 may use pulse compression in which the impulse response is matched to the input pulse signals. The matched filter 40 is composed of memory module(s) 42 and processor(s) 44. The memory module(s) 42 store transmit waveform profile data 43. This is the same data as the transmit waveform profile data 23 stored in the transmitter at 20. Data 43 may include a digital copy of the waveform profile 23. A user may manually enter this information in the memory 42 and/or the transmitter 20 and receiver(s) may communicate to share this data. In one embodiment, the transmitter 20 may wirelessly communicate the data to the receiver 30. In another embodiment, both the transmitter 20 and the receiver 30 may download the same data from a central server, database, or other repository. The processing performed by each of the receiver(s) 30 assumes that the received waveform samples (within a single pulse) are sufficiently accurate to produce the expected matched filter outputs. Since each receiver unit 30 stores the transmitted waveform profile data 43, the "direct path" matched filter responses for two pulses within a coherent processing interval (CPI) should differ from one another by some time offset.

The radar system 10 functions as a multi-static radar, in that, it is distributed, and each receiver(s) 30 has knowledge of the same transmitted waveform profile information used by the transmitter 20. It does not, however, necessarily require a second (or additional) receiver channel to obtain the direct-path information about the transmitted waveform. That is, knowledge of the transmitted waveform eliminates the need for a second or additional (reference) channel that are typically used to measure a matched filter response.

Figure 2:
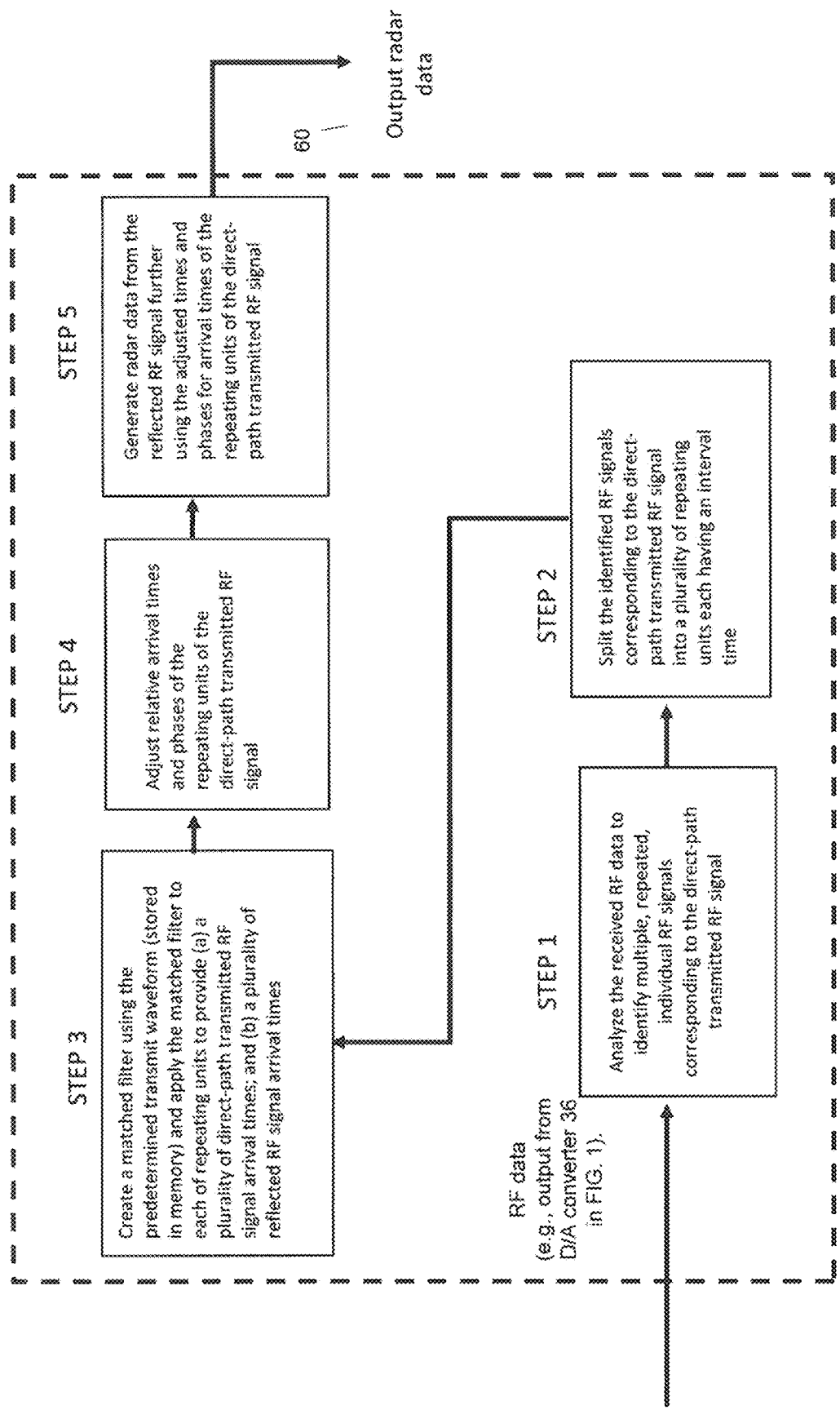
FIG. 2 is a schematic showing the novel processing steps according to embodiments.
Figure 2A:
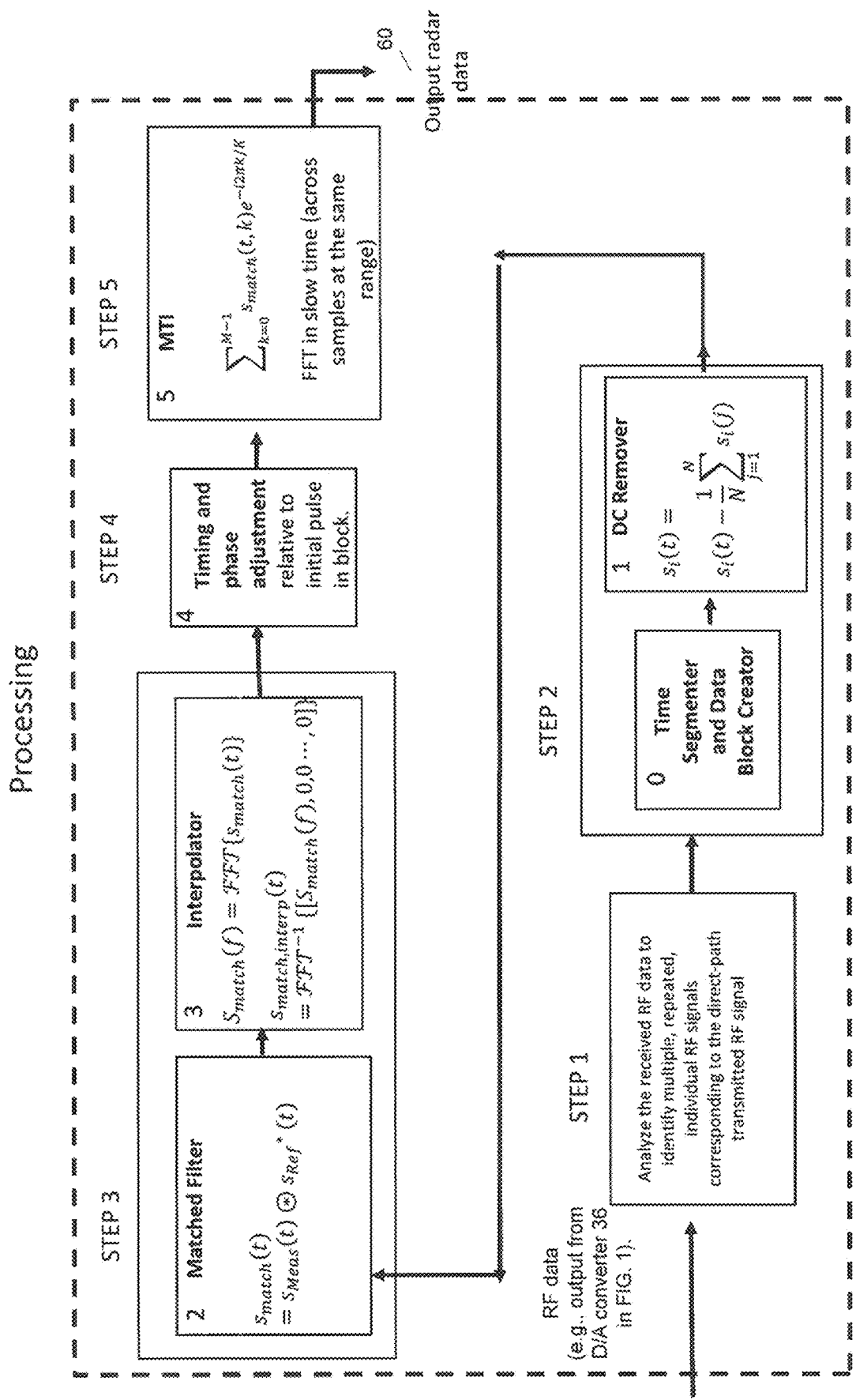
FIG. 2(A) is a specific embodiment for moving target indication (MTI) detection.

Processor(s) 44 perform novel processing of the RF data stream to create and apply a matched filter 40 for radar operations. FIG. 2 is a schematic showing the novel processing steps performed by the machine-executable instruction 45 executed by the processor(s) 44 of the matched filter of the receiver of the radar system according to embodiments. And FIG. 2(A) is a specific embodiment of processing using a moving target indication (MTI) detection algorithm. For ease of explanation the processing, further reference with be made to additional drawings.

Radar data 60 is output. The data 60 may be digital data have a suitable file structure. For example, data samples from a linear or non-linear chirp waveform sampled at a specified frequency could be stored in a binary or comma separated variable (csv) format, and read by both the transmitter and receiver waveform generation blocks.

In some implementations, the processor(s) 44 may be a programmable processor, such as, for example, a field-programmable gate array (FPGA) or an application-specific integrated circuit (ASIC) processor. The methodology disclosed herein may be implemented and executed by an application that may be created using any number of programming languages. An embodiment of invention has been reduced to practice by the inventors for processing instructions generated in using Mathworks® Matlab code and verified. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting. The methodology disclosed herein may be implemented and executed by an application and may be created using any number of programming languages.

Alternatively, embodiments of the matched filtering could be implemented as hardware (e.g., electrical circuit) using delay lines, stored replicas of the waveform (e.g. an arbitrary waveform generator), etc. The key point of this disclosure, however, is the processing methodology. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

The receiver collects RF data, converts the data to baseband, samples it, and streams it to the processor(s) 44, also known as a processing unit. The processing unit has full knowledge about the Tx waveform—in particular, its pulse duration and pulse repetition interval, from the stored transmit profile waveform data 43. The RF data stream is assumed to have a repeating profile of pulses as depicted in FIG. 3. Each pulse repetition interval (PRI) may be assumed to contain N samples (of time), and M of these PRIs constitute one coherent processing interval (CPI) of the pulse. Hence, each CPI contains N×M samples. In the example in FIG. 3, N=17 and M=3. It is with this assumed pulse repetition that additional processing of the RF data can be performed.

As mentioned earlier, the RF data stream includes both the direct-path RF signal transmitted from the transmitter and a reflected RF signal when the transmitted RF signal is reflected from the target.

Step 1

The first, initial process step is to analyze the received RF data to identify and locate multiple, repeated, individual RF signals corresponding to the direct-path transmitted RF signal.

To identify and locate multiple, repeated, individual RF signals corresponding to the direct-path transmitted RF signal, may involve identifying individual pulses within the RF data stream through an initial application of a standard, or a power-detecting, template matching filter. Such a filter can be applied to the magnitude of the complex input sequence. Maximum values of the filter output will occur when the non-zero filter values align with the largest received pulse, and these values are assumed to correspond to the direct-path signal.

Figure 4A:
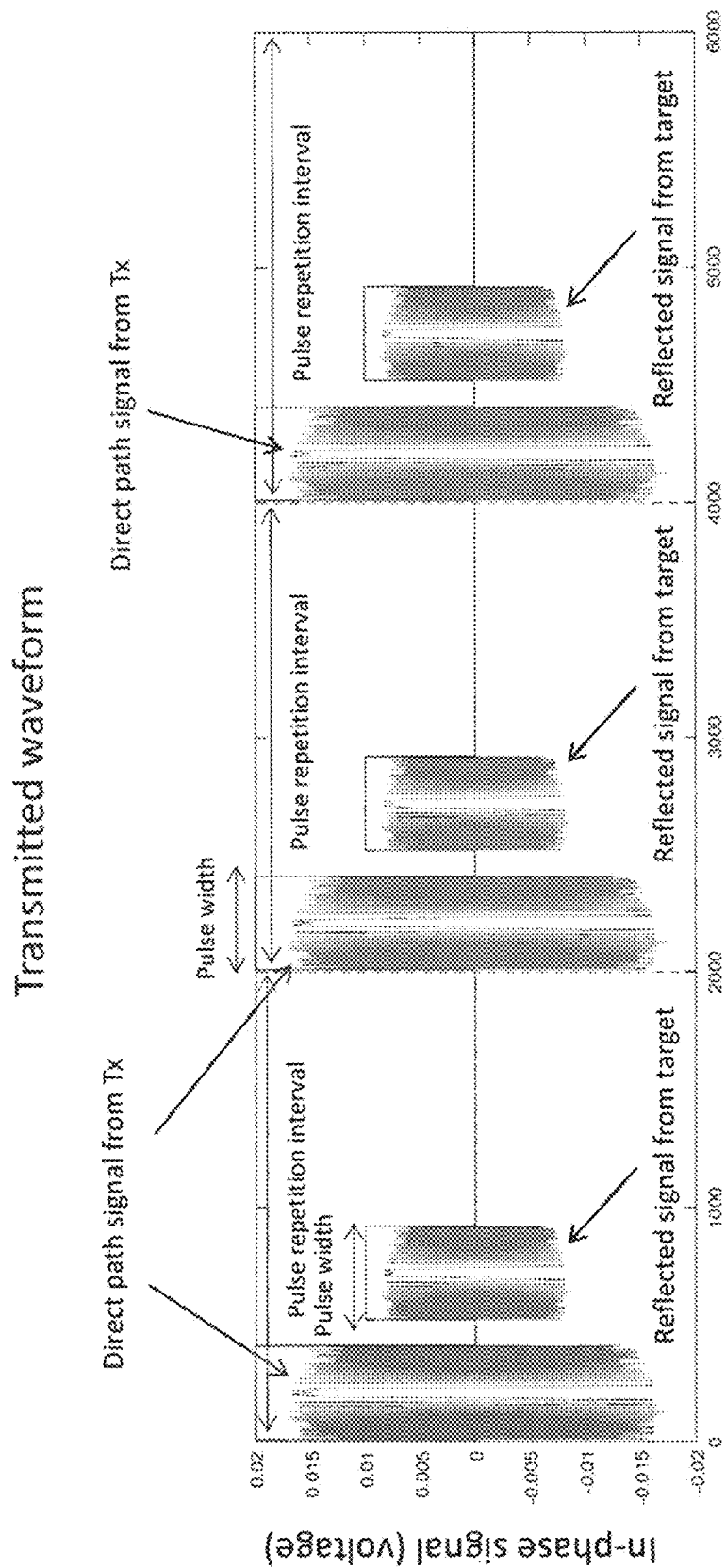
FIG. 4(A) is an illustration of an exemplary pulse sequence.
Figure 4B:
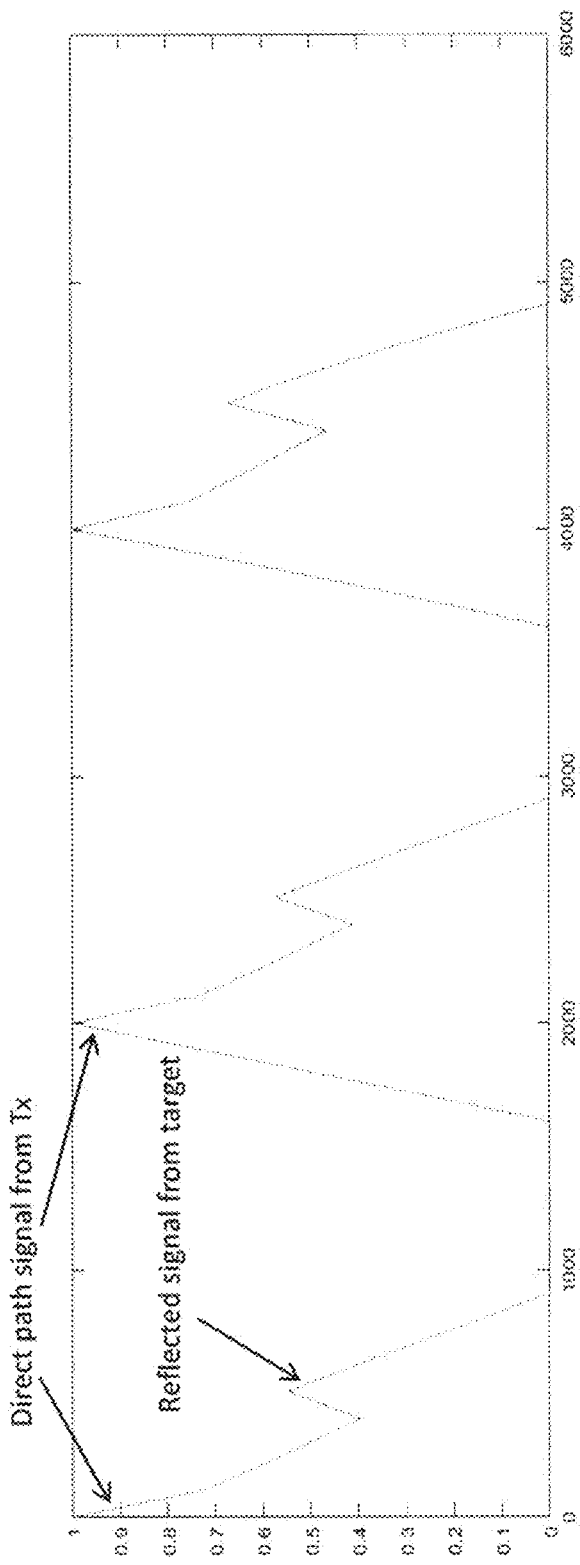
FIG. 4(B) is the corresponding power-detecting, template matching output.

For purposes of explanation of this processing step, reference is made to FIG. 4, in which FIG. 4(A) is an illustration of an exemplary pulse sequence, and FIG. 4(B) is the corresponding power-detecting, template-matching filter output. As apparent in FIG. 4(A), both signals are composed of pulses that repeat according to assumed pulse profile shown in FIG. 3. The power detecting matched filter may be generated to "look" for this pulse filter in the pulse sequence of FIG. 4(A). When a pulse sequence match is identified with this power detecting matched filter, a large magnitude "spike" is output. Here, the common definition of the magnitude of a complex number is used, wherein x is defined as $\sqrt{Re\{x\}^2+Im\{x\}^2}$, Re $\{x\}$ denotes the real part of x and Im$\{x\}$ denotes the imaginary part of x. The results of the power-detecting, template matching are shown in FIG. 4(B).

Figure 4C:
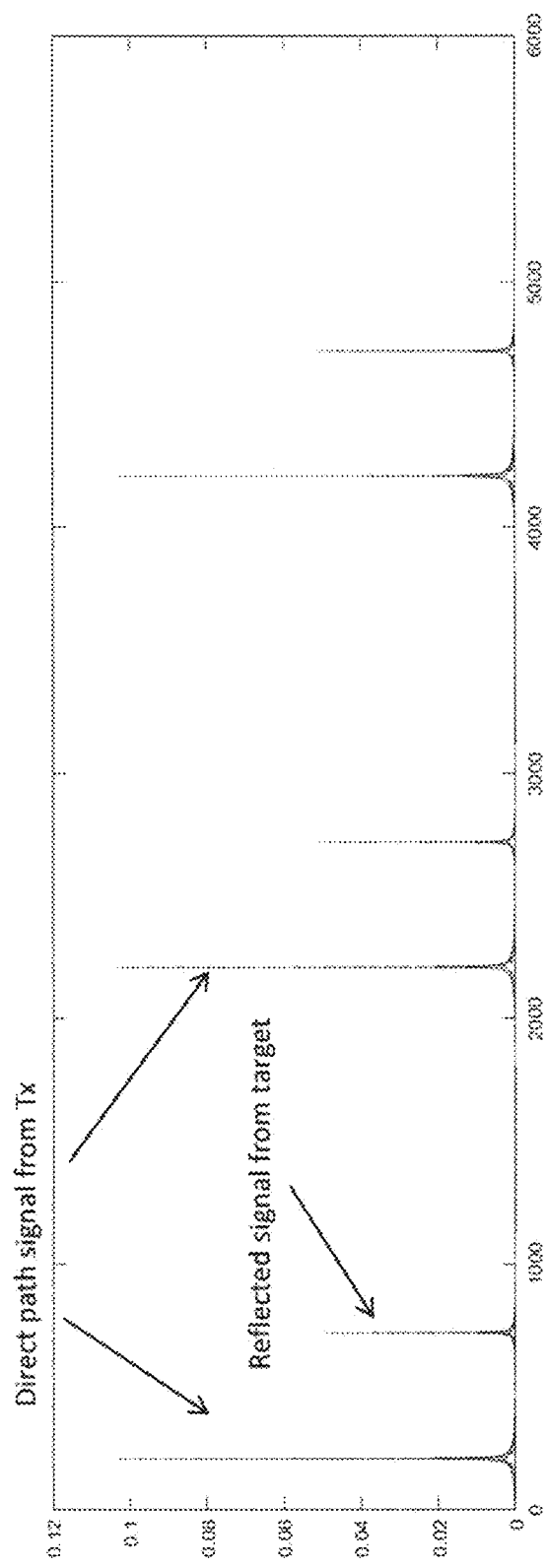
FIG. 4(C) is the output of applying standard matched filtering.

In another embodiment, the transmitted waveform profile (either directly stored in memory as, or derived from the transmitted waveform provide data 43) is directly correlated against the input signal such as with "standard matched filtering" known in the signal processing arts. The results of adapting standard matched filtering techniques to these ends are shown in FIG. 4(C).

In both cases, the locations of the largest peaks correspond to the locations of the direct-path pulses received from the transmitter. Since the direct-path RF transmit signal is known to have a greater magnitude (amplitude) than the reflected RF signal, the two signals can easily be identified.

Step 2

After locating the direct-path transmitted RF signal in the RF data, this processing splits the identified direct-path transmitted RF signal into a plurality of repeating units each having an interval time.

This may follow the general pulse profile depicted in FIG. 3 in which the signal is decomposed into M PRIs of length N that comprise a CPI to form the various repeating units. For instance, a time segmenter and data block creator may be executed via appropriate software processing, as shown in sub-process block 0 in FIG. 2(A)). Thus, the various repeating units can be handled for subsequent signal processing. This sub-process may be described by the following pseudo-code: s(t,i)=d(t+p1−α:t+p1−α+(i−1)*PRIlength), (1) where s(t,i) is the data block, d(t) is the input data stream, t is time, i is the repeating unit, p1 is the location of the initial direct-path peak, a is a user-defined offset, and PRIlength is the length of one PRI (known a priori), and $0 \leq i \leq M-1$.

To split the direct-path transmitted RF signal, processor(s) may use (a) a power-detecting, template, or (b) standard matched filtering. The power-detecting, template may be similar executed as explained with respect to FIG. 4(B). And the standard matched filtering may be similarly executed as explained with respect to FIG. 4(C). For the specific example of the power-detecting, matching template shown in FIG. 4(B), α=0 where the initial peak occurs in first repeating unit. And, for the specific standard matching example in FIG. 4(C), α is about ½ of pulse width where the initial peak occurs in the first repeating unit).

In some implementations (see sub-process block 1 in FIG. 2(A)), the DC components within each repeating unit are also be removed. Any residual constant offset (referred to in the literature as "DC offset") is removed from each PRI by subtracting the mean value of the corresponding complex (In-phase and Quadrature) data samples (i.e., the samples within that PRI). For example, the DC components within each repeating unit may be removed, according to the following formula:

$$s_i(t) = s_i(t) - \frac{1}{N}\sum_{j=1}^{N} s_i(j), \quad (2)$$

where $s_i(t)$ is the signal in the $i^{th}$ repeating unit, and N is the number of samples in the $i^{th}$ repeating unit.

It is noted that the order of STEPs 1 and 2 may vary in different embodiments, with STEP 2 proceeding STEP 1 or the two being performed (at least partially) together.

Step 3

The processing in this block creates a matched filter using the predetermined transmit waveform (stored in memory) and apply the matched filter to each of repeating units to provide (a) a plurality of direct-path transmitted RF signal arrival times; and (b) a plurality of reflected RF signal arrival times.

More particularly, the processing performs matched filtering using a stored replica of the transmitted waveform. This operation may correspond to the "standard matched filtering" (see sub-process block 2 in FIG. 2(A) commonly used by practitioners of the art, and it is described by:

$$s_{match}(t) = \sum_{i=0}^{K-1} s(i)s_{ref}^{*}(t-i), \quad (3)$$

where s(i) represents the transmitted signal and $s_{ref}(t)=s^*(-t)$, the time-reversed version of the transmitted signal, and K is the pulse width (i.e. the number of samples constituting a pulse, as indicated in FIG. 4(B)). The length of the matched filter is the length of the transmitted waveform.

Figure 5:
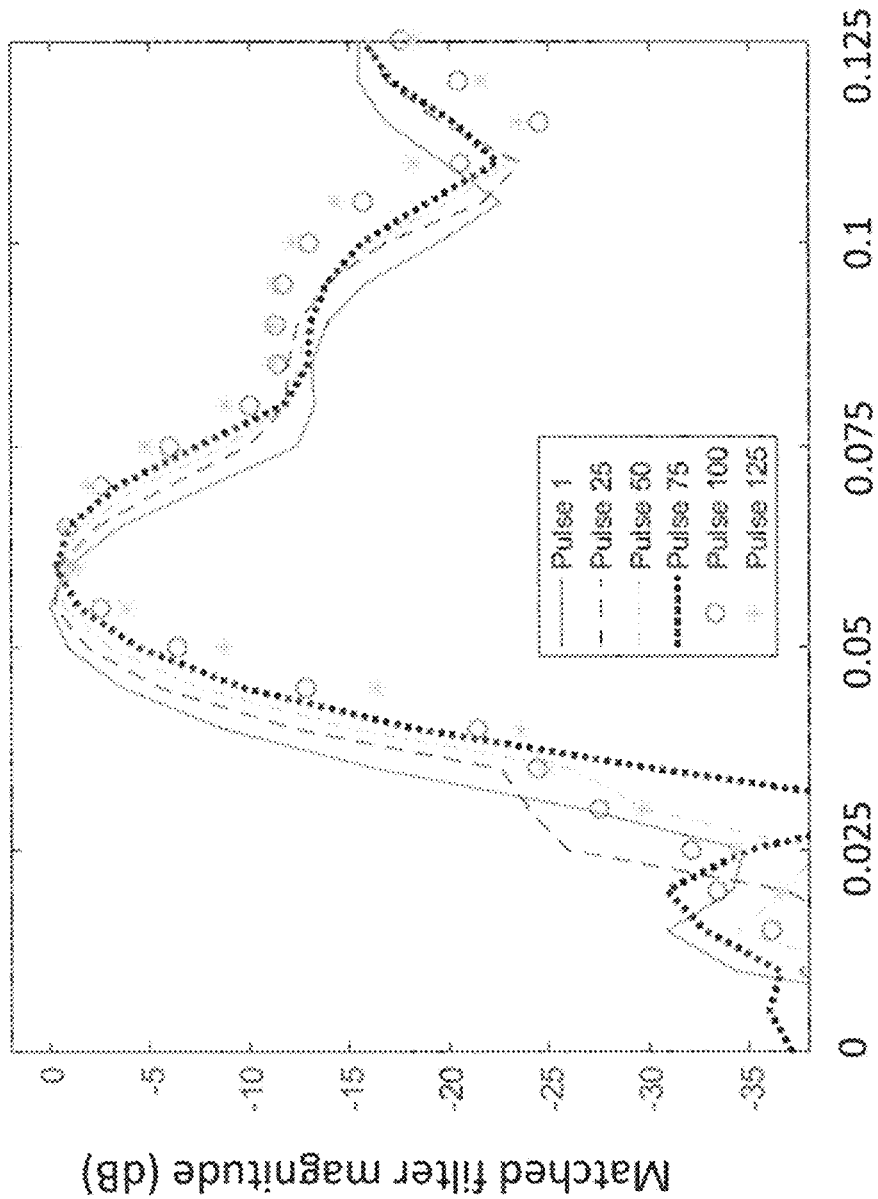
FIG. 5 is a plot showing measured data for matched-filter outputs for the direct-path signal from several pulses within in a single CPI.

FIG. 5 is a plot showing measured data for matched-filter outputs for the direct-path signal from several pulses within in a single CPI. If the transmit and receive channels were coherent, then the peaks of all the pulses depicted in the plot would lie on top of one another. Instead, we notice a time drift that is already evident by pulse number 25, and has become severe by pulse number 125. This illustrates the need for an adjustment of all pulses within a CPI (typically, 256 to 1024 pulses) relative to a reference pulse.

In some embodiments to improve the accuracy of the peak estimate within each repeating interval, the matched filter output may be interpolated by a predetermined interpolation factor. The interpolation procedure may be implemented by a suitable interpolator (see sub-process block 3 in FIG. 2(A)), for instance, using the classical zero-padding technique. This is also described by the following Matlab command, commonly used by practitioners of the art, wherein interpFact denotes the interpolation factor, FFT denotes the Fast Fourier Transform, and IFFT denotes the inverse FFT:

$$s_{match,interpolated}(t,:) = IFFT\left(circshift\left(\left[circshift\left(FFT(s(t,:)), \frac{N}{2}\right),\right.\right.\right. \quad (4)$$
$$\left.\left.\left.zeros(M*(interpFact-1),1)\right], -\frac{N}{2}\right)\right)$$

Figure 6:
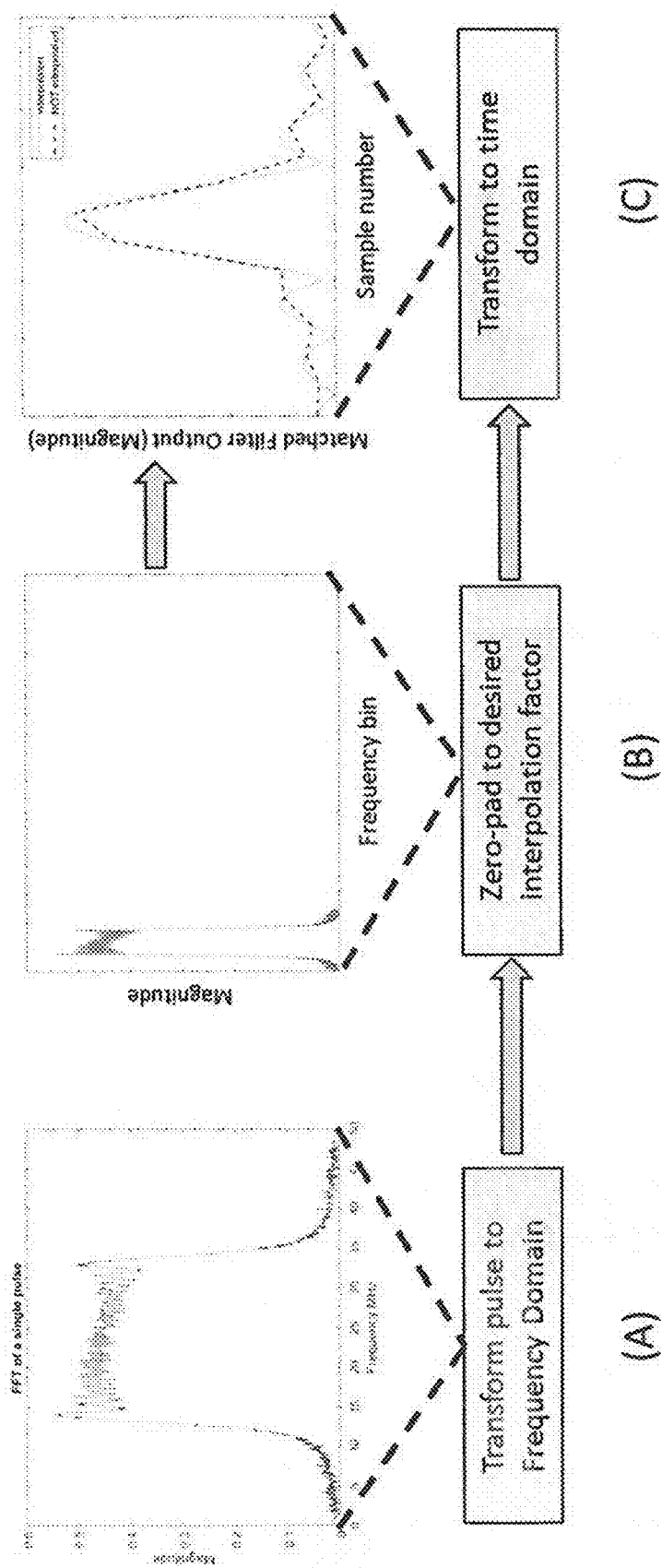
FIGS. 6(A), 6(B) and 6(C) show an example of interpolation by using zero-padding, where

An example of interpolation by using zero-padding is illustrated in FIG. 6. First, the pulse which is in the time domain is transformed into the frequency domain as shown in FIG. 6(A). Next, we zero-pad to a desired interpolation factor shown in FIG. 6(B). The interpolation factor corresponds to the number of zeroes which are padded. We then transform the pulse back to the time domain as shown in FIG. 6(C).

Figure 7:
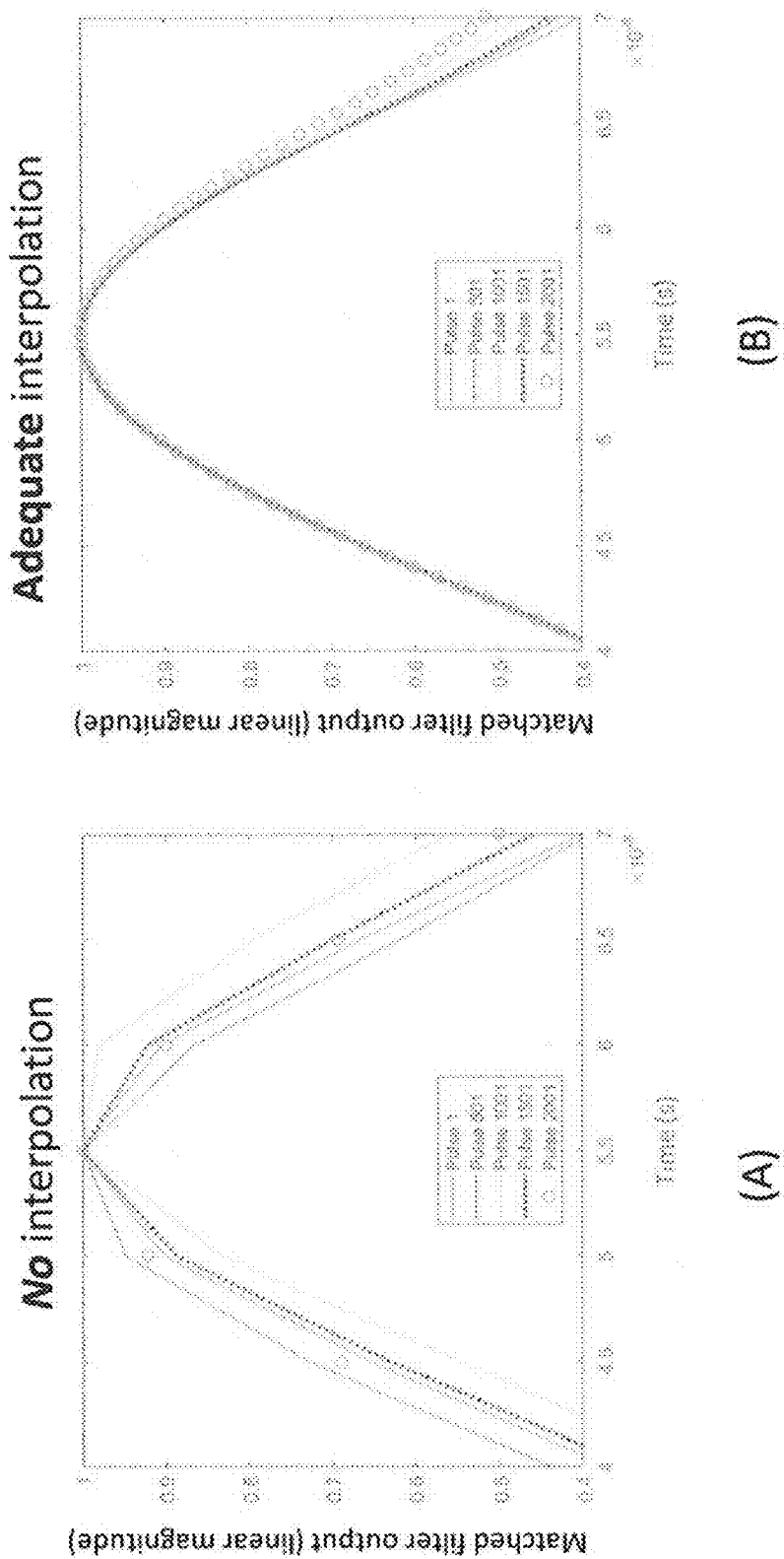
FIGS. 7(A) and 7(B) are plots of the adjusted (aligned) direct-path signals, where

FIG. 7 includes plots of the adjusted (aligned) direct-path signals, showing (a) no interpolation, and (b) after interpolation. From the plots, it is clear that the selected interpolation factor will affect the ability of the system to accurately estimate the peak of the direct-path signal. That is, if the interpolation factor is too low, then the peak sample value may differ from the actual peak value by as much as 3 dB. This effect is illustrated by the plots in FIG. 7(A), wherein the asymmetry between samples on either side of the selected peak is particularly evident in pulses 501 and 1001. The correction parameters estimated from these samples will likely be inadequate for successful time alignment. A typical value of the interpolation factor used in practice may be in the range of 10 to 20, and FIG. 7(B) shows the results of aligning the peaks following interpolation by a factor of 20. These pulses are sufficiently aligned to enable subsequent coherent processing.

Step 4

Here, the processing adjusts relative arrival times and phases of the repeating units of the direct-path transmitted RF signal.

Its input data here may preferably comprise the interpolated, CPI data block of size (N*interpFact) x M that is used to perform calculations across pulses. The first N*interpFact samples serve as the reference PRI, and all other pulses are adjusted relative to it. That is, the direct-path peak from pulse 2 is shifted so that it aligns with the direct-path peak from pulse 1, the direct-path peak from pulse 3 is shifted so that it aligns with the direct-path peak from pulse 1, and so on. In addition to aligning the peaks, the phases are also adjusted so that the samples at all direct-path peak locations are identical and equal to the phase at the direct-path peak from pulse 1. (see sub-process box 4 in FIG. 2(A)).

In general, this step may be summarized as: (a) determine the time and phase within the first repeating unit of the first arrival (occurrence/peak) of the direct-path transmitted RF signal; (b) set the time and phase for the determined first arrival time as a reference time and phase, respectively; and (c) adjust the times and phases of the first arrivals of the identified direct-path transmitted RF signal and reflected RF signal within each of the remaining repeating units so that the direct-path transmitted signal matches the reference time and phase.

While the phase adjustment is applied to both signals (direct-path and reflected), only the phase of the direct-path signal will end up matching the reference. The adjusted phase, and perhaps also the time offset of the corrected, reflected signal will, most likely, not match those of the reference signal. (It is the changes in phase, for instance, that enable us to detect the moving target, if using MTI). Put another way, the reflected signal (in repeating unit pulses 2 to M) is not compared to the reference reflected pulse (in the first repeating unit pulse). Adjustments in the reflected pulse follow only from the adjustments made to the direct-path signal.

Figure 8:
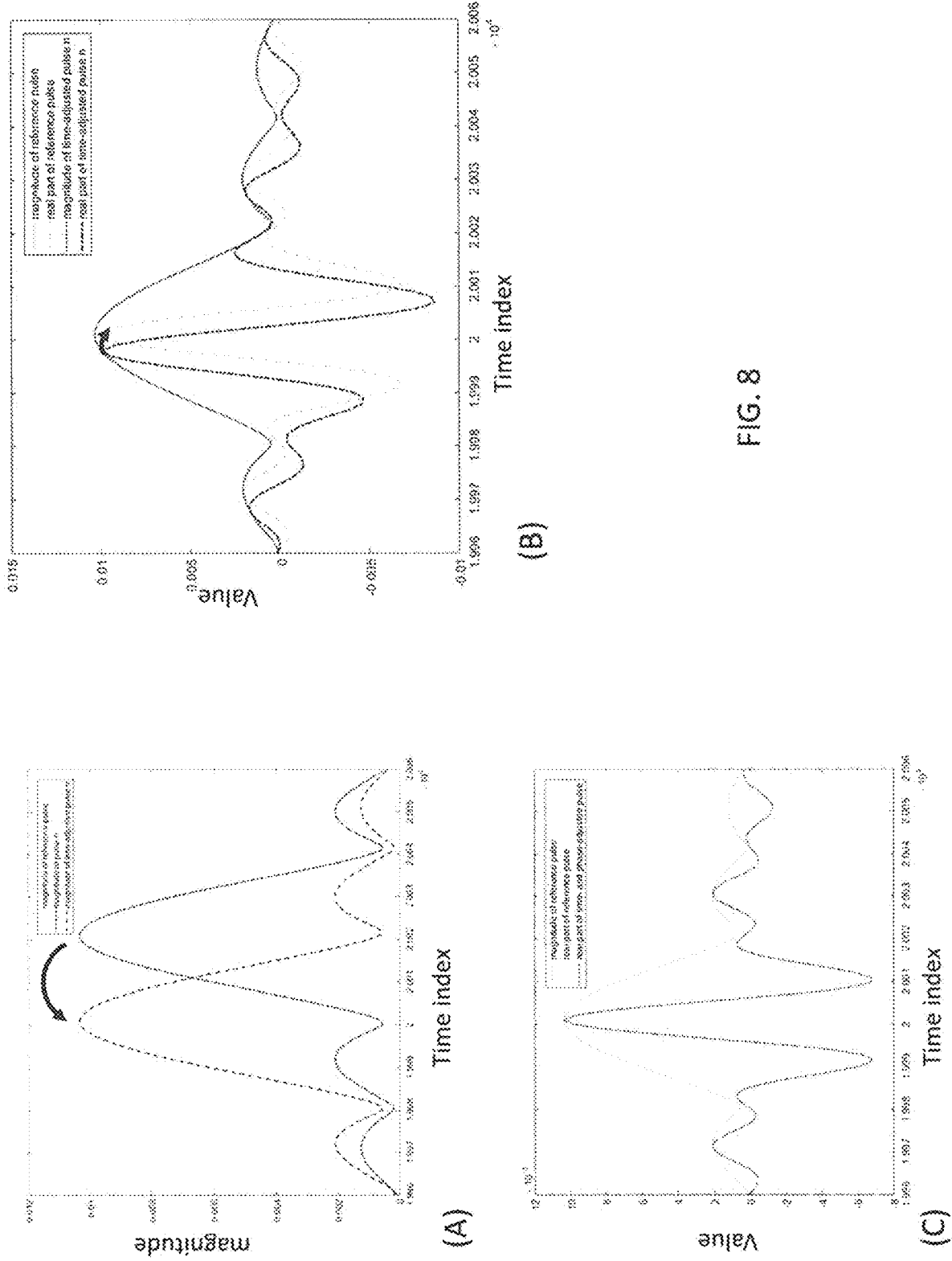
FIGS. 8(A), 8(B) and 8(C) are graphical illustrations (using notional data) describing the alignment/adjustment procedure, where

These corrections are outlined in the diagrams of FIG. 8 and later with respect to the flowchart of FIG. 9, where $s_{match,initial}(t)$ corresponds to the interpolated, matched filter output of pulse 1, and $s_{match,interpolated}(t,i)$ corresponds to the interpolated, matched filter output of pulse i (the pulse currently being processed). The entire location- and phase-correction process for pulse i is described by the Matlab operation familiar to practitioners of the art:

$$s_{match,adjusted}(t,i) = \text{circshift}(s_{match,interpolated}(t,i),[\text{off-set}_i,0]).*\exp(-\theta_i + \theta_{ref}), \quad (5)$$

where offset$_i$ is the offset between the current peak and the reference peak, $\theta_i$ is the phase extracted from the direct-path peak for pulse i, and $\theta_{ref}$ is the phase extracted from the direct-path peak of the reference (first) pulse. The values of offset$_i$ can be either negative or positive, depending on whether the current peak is to the right (offset$_i$<0) or to the left (offset$_i$>0) of the reference peak. For complex number, x, the phase represents the standard rotation angle of the phasor within the complex plane as defined by:

$$\theta_x = \arctan\left(\frac{\mathcal{I}m\{x\}}{\mathcal{R}e\{x\}}\right) \quad (5a)$$

where $\mathcal{R}e\{x\}$ represents the real (in-phase) part of x, and $\mathcal{I}m\{x\}$ represents the imaginary (quadrature) part of x.

FIGS. 8(A), 8(B) and 8(C) are graphical illustrations (using notional data) describing the alignment/adjustment procedure, where FIG. 8(A) shows coarse time alignment/adjustment, FIG. 8(B) shows phase alignment/adjustment, and FIG. 8(C) details the result after time- and phase-alignment showing "perfect" overlay of second pulse onto first pulse.

Step 5

Next, the processing generates radar data from the reflected RF signal further using the adjusted times and phases for arrival times of the repeating units of the direct-path transmitted RF signal.

Following the alignment performed in aforementioned processing step, the data block input to this processing step is coherent and suitable for, e.g., Doppler processing. In this case (for Doppler processing), a fast Fourier transform (FFT) procedure may be performed across pulses at each sample location, as described by:

$$s_{range,doppler}(t,d) = \sum_{k=0}^{M-1} s_{match,adjusted}(t,k) e^{-i2\pi k/K}, \quad (6)$$

yielding imagery that displays energy reflected by targets at specific ranges moving at specific radial velocities.

Figure 10:
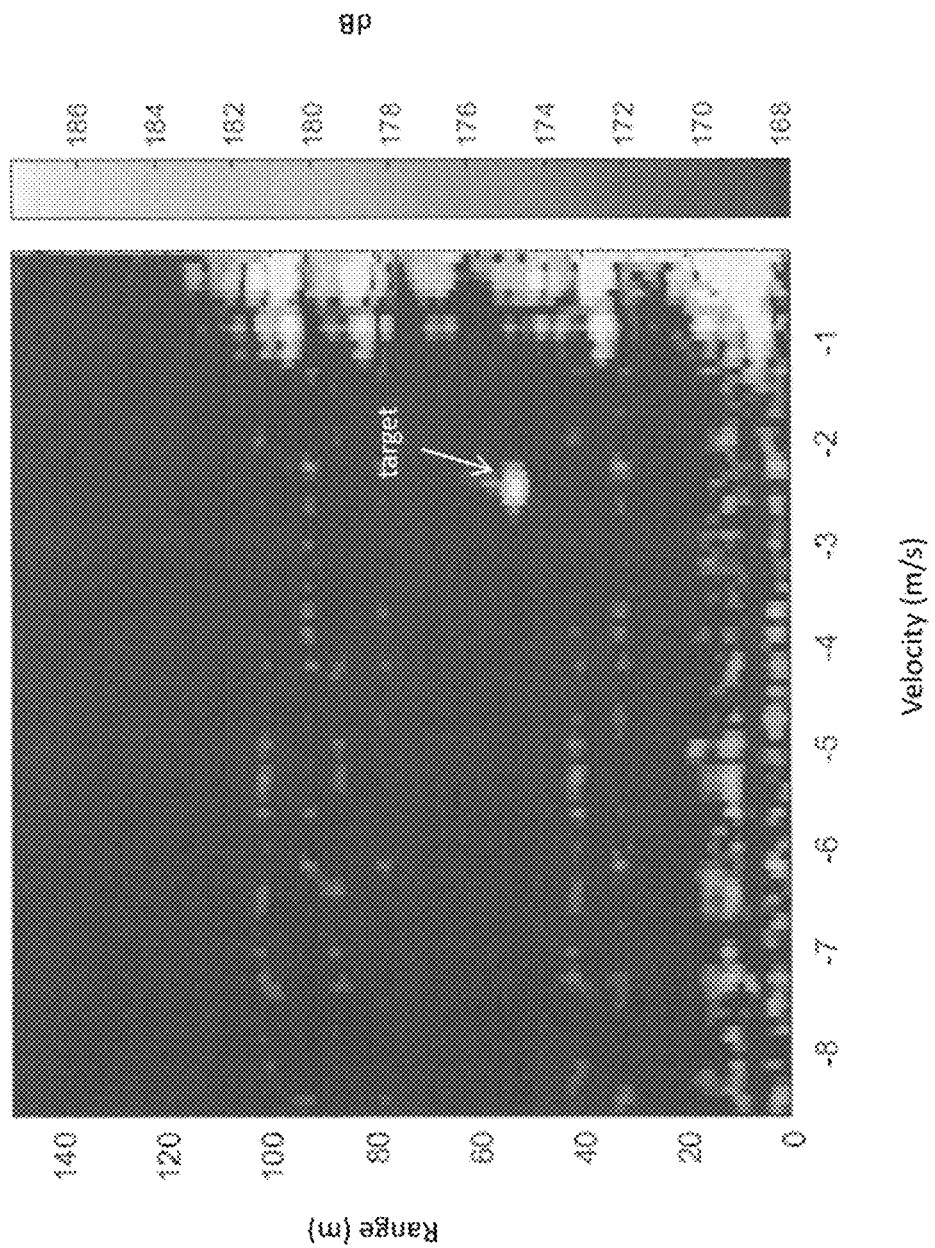
FIG. 10 is an example of MTI processed radar imagery output according to an embodiment.

The radar data 60 thus generated is output. An example of radar imagery output is included in FIG. 10, where a log scale has been used to display image pixel values. Note that alternative coherent processing modes known to practitioners of the art, such as synthetic aperture radar (SAR) processing, could also be implemented at this point. For SAR applications, an additional alignment step is required prior to the process described above. (This is due to the motion of the receiver). This adjustment requires precise knowledge of both the transmitter and receiver location and can be described by two Matlab equations:

$$s_{match,interpolated}(t) = \text{circshift}(s_{match,interpolated}(t)\Delta n), \quad (6a)$$

and $$s_{match,adjusted}(t,k) = \text{circshift}(s_{match,adjusted}(t,k)*\exp(1i*\Delta\theta_k),-\Delta n), \quad (6b)$$

where $\Delta n$ equals the number of time-domain samples corresponding to the difference, $\Delta d$, between the distance from transmitter to receiver at location 1 and the distance from transmitter to receiver at location 2. This value for $s_{match,interpolated}(t)$ is then input to the process described above to align the direct path signal in both amplitude and phase. Following the alignment procedure, the direct-path peak is shifted in the opposite direction by $\Delta n$, and the phase offset, $\Delta\theta_k$, corresponding to $\Delta d$ at the carrier frequency is reintroduced, as indicated by EQ (6b). (Note that the time and phase offsets corresponding to $\Delta d$ were eliminated by the alignment procedure. They are both required, however, to perform SAR processing).

Figure 9:
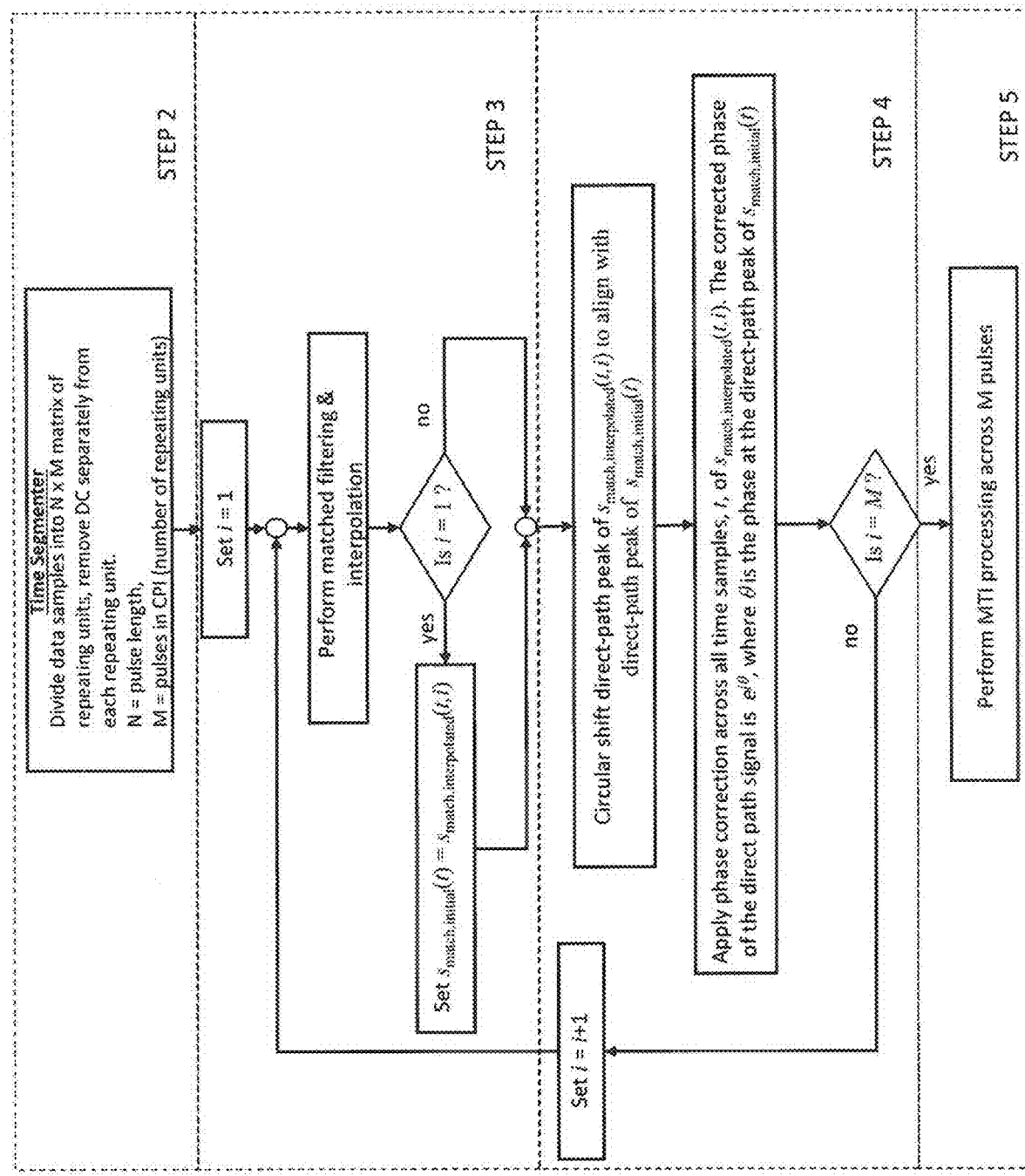
FIG. 9 is a flowchart depicting the processing steps described above for STEPS 2-5 in FIG. 2 specifically for MTI processing.

FIG. 9 is a flowchart depicting the processing steps described above for STEPs 2-5 specifically for MTI processing.

Figure 11:
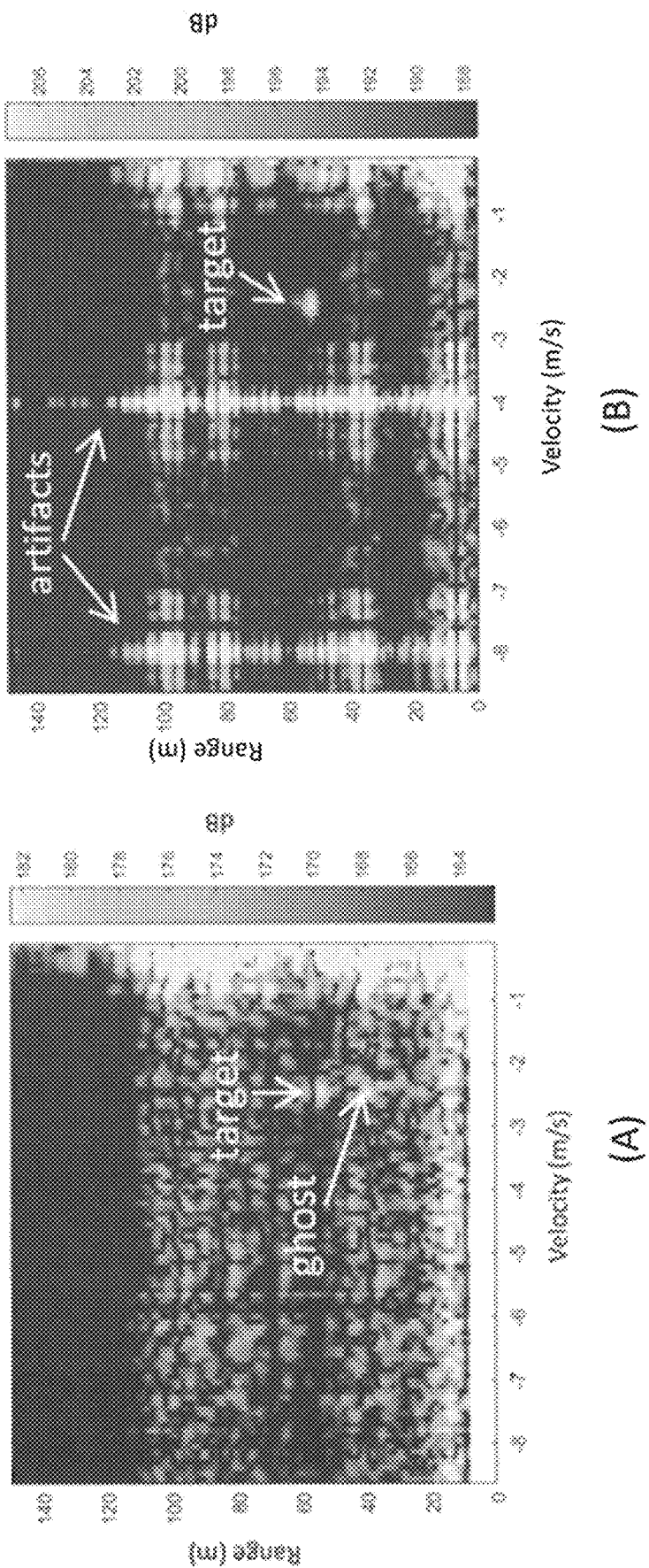
FIG. 11(A) is a radar image showing the results of performing MTI processing without application of the interpolation processing.
FIG. 11(B) shows the results of inadequate interpolation.

As mentioned earlier, the interpolation processing can enable more effective coherent processing when it would otherwise not be available. For comparison sake, FIG. 11(A) is a radar image showing the results of performing MTI processing without application of novel interpolation processing. Since no time corrections have been applied, the drift in time is not corrected, and the target appears to be "buried" in a higher noise background. In addition, a second "ghost" target has appeared. FIG. 11(B) shows the results of inadequate interpolation (i.e., using an interpolation factor that is too low). Various artifacts are clearly apparent.

With reference to FIG. 2(A), the range/Doppler image produced by sub-process box 4 is input to sub-process box 5, where a suitable moving target indication (MTI) detection algorithm is applied. As part of the process, the entire range/Doppler space is restricted to pre-defined regions of interest corresponding to (range, Doppler)-coordinates at which targets are expected to be found. This step is required because the range and Doppler coverage of the radar is likely to exceed the detectable range and maximum velocity of most targets of interest. One embodiment of the MTI detection algorithm comprises a two-dimensional constant-false-alarm-rate (CFAR) algorithm as outlined at https://www-.mathworks.com/help/phased/ref/2dcfardetector.html, the webpage herein incorporated by reference.

In some cases, a MTI detector and Range/Doppler delimiter used for MTI radar processing may require a range estimate, and the precision of that estimate depends on the precision of the available position information (i.e., of the transmitter and receiver). If detailed position information is available, then precise range estimates can be obtained. Even if no position information is available, however, it is still possible to detect the target.

As was previously alluded to in Background section, conventional ground-based passive radar systems typically cross-correlate two measured signals to obtain a matched filter output. Such a system is subject to the limitations imposed by the transmitter of opportunity—often a television or radio broadcast channel. For example, the location of the transmitter, as well as the available bandwidth are typically fixed. Increased bandwidth enables increased down-range resolution. Geographically dispersed bistatic and multi-static systems experience similar problems relative to synchronization; although waveform limitations are not an issue.

Since the novel radar system according to embodiments of the present invention retains control of the transmitter, it is not subject to stringent location and bandwidth restrictions. (In order to obtain precise range estimates, it might still require to maintain knowledge of the transmitter and receiver locations. These, however, are under the control of the user.) In addition, the novel radar system does not necessarily require a second channel to measure the direct-path "reference" signal for correlation with the target measurement. By using exact information/knowledge of the transmitted waveform, the matched filter processing by the receiver performs pulse compression and time-alignment using data measured by the surveillance (and not a reference) receive channel.

The novel technology overcomes the limitations in down-range resolution imposed by the low bandwidths available from most non-cooperative transmitters of opportunity. It also provides functionality when synchronization via GPS is not possible (e.g. due to loss of GPS signal). In such a case, moving target detection would be possible, although estimates of target range would be degraded.

Other impulse-based systems typically are not able to exploit the large amount of integration available to Doppler-based processors. Since embodiments of this invention may be configured to exploit Doppler techniques, it is able to effectively separate moving target signatures from stationary background clutter.

The innovative technology exploits exact knowledge of the transmitted waveform, and does not use a second receive channel to obtain the reference signal for matched-filter processing. We have incorporated a cooperative transmitter, realized using similar hardware. Note that the only real requirement is knowledge of the transmitted waveform that is detailed enough to ensure production of the "correct" matched filter output. Additionally, the technology also does not require a separate means (e.g., GPS clock) of synchronizing dispersed receive units.

Embodiments of this invention could be readily used for area surveillance. In some embodiments, the transmitter could be at a different location than the receiver(s) provided that the surveillance unit would still have line-of-sight to ensure a strong direct-path signal. For instance, the transmitter may be located in close proximity to the squad. This would also enable relatively inexpensive bi-static moving target detection from many different viewing angles (i.e., one transmitter and many, non-synchronized receivers). Commercial users could include security firms interested in moving target detection (i.e., securing an area's perimeter, performing security patrols). Additional applications could include synthetic aperture radar imaging of multiple areas using a single transmitter and multiple receivers.

While the present invention has been illustrated by the description of embodiments, and while the embodiments have been described in detail, it is not intended to restrict the scope of the appended claims to these details. Additional advantages and modifications will readily appear to those skilled in the art. The specification should be considered exemplary only, and the scope of the invention is intended to be limited only by the following claims.

We claim:

1. A radar system comprising:
at least one radio receiver comprising:
   an antenna configured to receive RF data including both the direct-path RF signal transmitted from a radio transmitter and a reflected RF signal when the transmitted RF signal is reflected from a target;
   a memory configured to store the predetermined RF waveform profile data used by the radio transmitter to generate and transmit the RF signal;
   a timing unit to provide timing;
   a matched filter application configured to generate and apply a matched filter for identifying RF signal signatures in RF data; and
   one or more processors configured to:
   (i) analyze the received RF data to identify multiple, repeated, individual RF signals corresponding to the direct-path transmitted RF signal;
   (ii) split the identified RF signals corresponding to the direct-path transmitted RF signal into a plurality of repeating units each having an interval time;
   (iii) create a matched filter using the stored predetermined transmit waveform profile data in the memory and apply the matched filter to each of repeating units to provide (a) a plurality of direct-path transmitted RF signal arrival times; and (b) a plurality of reflected RF signal arrival times;
   (iv) adjust relative arrival times and phases of the repeating units of the direct-path transmitted RF signal in which the one or more processors are configured to:
      (1) determine the time and phase within the first repeating unit of the first arrival of the direct-path transmitted RF signal;
      (2) set the time and phase for the determined first arrival time as a reference time and phase, respectively; and
      (3) adjust the times and phases of the first arrivals of the identified direct-path transmitted RF signal and reflected RF signal within each of the remaining repeating units so that the direct-path transmitted signal matches the reference time and phase; and (v) generate radar data from the reflected RF signal further using the adjusted times and phases for arrival times of the repeating units of the direct-path transmitted RF signal.

2. The system of claim 1, wherein in process (i), to analyze the received RF data to identify multiple, repeated, individual RF signals corresponding to the direct-path transmitted RF signal, the one or more processors are configured to apply a power-detecting matched filter.

3. The system of claim 1, wherein in process (ii), to split the direct-path transmitted RF signal, the one or more processors are further configured to remove DC components within each of the repeating units.

4. The system of claim 1, wherein in process (ii), to split the direct-path transmitted RF signal, the one or more processors use a power-detecting, template, or standard matched filtering.

5. The system of claim 1, wherein in process (iii), to create and apply the matched filter, the one or more processors are configured to use standard matched filtering.

6. The system of claim 1, wherein in process (iii), to create and apply the matched filter, the one or more processors are further configured to: interpolate the matched filter output for the arrival times for each of the repeating units by a predetermined interpolation factor.

7. The system of claim 6, wherein the predetermined interpolation factor is a value from 10 to 20.

8. The system of claim 1, where in process (v), to generate radar data, the one or more processors are configured to apply a moving target indication (MTI) detection algorithm or a synthetic aperture radar (SAR) detection algorithm.

9. The system of claim 1, where the at least one radio receiver comprise two or more radio receivers.

10. The system of claim 9, wherein the timing units of the two or more radio receivers have same clock rate.

11. The system of claim 1, wherein the at least one radio receiver stores an exact copy of the transmitted RF signal waveform profile data used by the radio transmitter to generate and transmit the RF signal.

12. The system of claim 1, wherein the timing unit of the at least one radio receiver operates at frequencies from 250 MHz to 1.2 GHz.

13. The system of claim 1, wherein the timing unit of the receiver is independent of the timing of the radio transmitter.

14. The system of claim 1, wherein the at least one radio receiver does not use a synchronization signal provided by the radio transmitter.

15. The system of claim 1, wherein the at least one radio receiver does not use GPS.

16. The system of claim 1, further comprising: the radio transmitter configured to transmit the RF signal to the target generated according to the predetermined RF waveform profile data.

17. The system of claim 16, wherein the transmitter and at least one radio receiver are software defined radios (SDRs).

18. The system of claim 1, wherein the antenna of the at least one radio receiver consists of a single antenna configured to receive RF data including both the direct-path RF signal transmitted from a radio transmitter and a reflected RF signal when the transmitted RF signal is reflected from the target.

19. A radio receiver comprising:
   an antenna configured to receive RF data including both a direct-path RF signal transmitted from a radio transmitter and a reflected RF signal when the transmitted RF signal is reflected from a target;
   a memory configured to store the predetermined RF waveform profile data used by the radio transmitter to generate and transmit the RF signal;
   a timing unit to provide timing;
   a matched filter application configured to generate and apply a matched filter for identifying RF signal signatures in RF data; and
   one or more processors configured to:
   (i) analyze the received RF data to identify multiple, repeated, individual RF signals corresponding to the direct-path transmitted RF signal;
   (ii) split the identified RF signals corresponding to the direct-path transmitted RF signal into a plurality of repeating units each having an interval time;
   (iii) create a matched filter using the stored predetermined transmit waveform profile data in the memory and apply the matched filter to each of repeating units to provide (a) a plurality of direct-path transmitted RF signal arrival times; and (b) a plurality of reflected RF signal arrival times;
   (iv) adjust relative arrival times and phases of the repeating units of the direct-path transmitted RF signal in which the one or more processors are configured to:
     (1) determine the time and phase within the first repeating unit of the first arrival of the direct-path transmitted RF signal;
     (2) set the time and phase for the determined first arrival time as a reference time and phase, respectively; and
     (3) adjust the times and phases of the first arrivals of the identified direct-path transmitted RF signal and reflected RF signal within each of the remaining repeating units so that the direct-path transmitted signal matches the reference time and phase; and
   (v) generate radar data from the reflected RF signal further using the adjusted times and phases for arrival times of the repeating units of the direct-path transmitted RF signal.

* * * * *